United States Patent [19]

Kadomatsu

[11] Patent Number: 4,611,911
[45] Date of Patent: Sep. 16, 1986

[54] ELECTRO-OPTICAL DISTANCE MEASURING DEVICE

[75] Inventor: Yuji Kadomatsu, Kawasaki, Japan

[73] Assignee: Nippon Kogaku K.K., Tokyo, Japan

[21] Appl. No.: 684,580

[22] Filed: Dec. 21, 1984

[30] Foreign Application Priority Data

Dec. 26, 1983 [JP] Japan ............................ 58-249096
Dec. 26, 1983 [JP] Japan ............................ 58-249097

[51] Int. Cl.$^4$ ............................................. G01C 3/08
[52] U.S. Cl. ................................................... 356/5
[58] Field of Search ................. 356/5; 354/400, 402, 354/408

[56] References Cited

U.S. PATENT DOCUMENTS 4,165,936  8/1979  Eisenring et al. ................ 356/5
4,504,143  3/1985  Heinze et al. ..................... 356/5

FOREIGN PATENT DOCUMENTS 57-86771  5/1982  Japan .

Primary Examiner—Donald A. Griffin
Attorney, Agent, or Firm—Shapiro and Shapiro

[57] ABSTRACT

Distance measurement apparatus comprises a collimating optical system and an optical path divider. The collimating optical system contains an objective lens, a focusing lens and an eye-piece arranged in the named order. The optical path divider is disposed between the objective lens and the focusing lens. A reflecting member is provided on the optical path branched by the optical path divider. The reflecting member has first and second reflecting surfaces which intersect each other at right angles. A light source supplies a beam of transmission light to the first reflecting surface. A photo receptor receives the beam of light reflected by the second reflecting surface. An auxiliary lens is provided between the optical path divider and the reflecting member and cooperates with the objective lens to form an afocal system.

7 Claims, 5 Drawing Figures

ELECTRO-OPTICAL DISTANCE MEASURING DEVICE

BACKGROUND OF THE INVENTION

1. Field of the Invention

The present invention relates to a surveying instrument and more particularly to an electro-optical distance measuring device.

2. Description of the Prior Art

In the art there are known many kinds of electro-optical distance measuring devices of the type in which the objective lens of the collimating optical system and the objective lens of the distance measuring optical system are used in common to the two systems. In this type of known devices the distance measuring optical system needs a very precise alignment of the optical paths for transmission and reception to obtain high accuracy of measurement. Because of it there have been great difficulties not only in design and manufacture but also in assembling and adjustment. As for adjustment it may be carried out more easily by providing separate adjustment means proper to the respective optical systems. However, it renders the construction of the whole device complicated and the size larger.

As to means for dividing the optical path into that for collimating optical system and that for distance measuring optical system there have already been realized also many types of optical path-dividers (beam splitters). For the known electro-optical distance measuring devices of the type in which one half of the objective lens aperture is used to transmit the light and the other half is used to receive the light, there has been generally employed a slant half-mirror to branch the optical path for distance measuring optical system. In this case, the half-mirror must be disposed 45° inclined relative to the optical path. Therefore, the thickness on optical axis of the prism constituting the half-mirror is large, which in turn lengthens the optical path of the collimating optical system. As a whole the distance measuring device has a large structure.

Since the light generally used for distance measurement is infrared, it is preferable to form the optical path-divider using a dichroic mirror. However, the use of dichroic mirror involves some problems. Because the dichroic mirror is usually formed of a multi-layer thin film, its performance drops down with increasing the incident angle of the infrared light. When the incident angle is smaller, the dichroic mirror exhibits better performance and it is easier to manufacture. Considering these points Japanese Laid Open Patent Application No. 86,771/1982 has proposed an arrangement of electro-optical distance measuring device in which the angle of incidence to the dichroic mirror is smaller than 45°. However, even in this device, the prism of optical path-divider has still large thickness on optical axis, which is against the desire to reduce the size of the collimating optical system.

SUMMARY OF THE INVENTION

Accordingly it is an object of the present invention to provide an electro-optical distance measuring device which is compact in construction and excellent in operability.

It is another object of the invention to provide an electro-optical distance measuring device which is simple in structure and easy to assemble and adjust.

In the device according to the invention the collimating optical system comprises an objective lens, a focusing lens and an eye-piece arranged in the named order. An optical path divider is disposed between the objective lens and the focusing lens. A reflecting member is provided on the optical path branched by the optical path divider. The reflecting member has first and second reflecting surfaces which intersect each other at right angles. A light source supplies a beam of transmission light to the first reflecting surface. A photo receptor receives the beam of light reflected by the second reflecting surface. Between the optical path divider and the reflecting member there is an auxiliary lens which cooperates with the above objective lens to form an afocal system.

In a preferred embodiment of the invention, the optical path divider is formed of a prism having an entrance surface substantially perpendicular to the optical axis of the collimating optical system, a first exit surface substantially parallel to the entrance surface and a slant half-mirror surface between the entrance surface and the first exit surface. In the prism the light beam reflected by the half-mirror surface is total-reflected by the entrance surface. The prism has a second exit surface which the total-reflected light beam by the entrance surface passes through.

With the above arrangement according to the invention, therefore, the optical path divider divides the optical path by reflecting the beam two times by the half-mirror surface and by the total-reflecting surface. This enables to reduce the thickness on optical axis of the prism block required to extract the optical path for the distance measuring optical system from the optical path common to the collimating optical system. Thus a substantial reduction of size can be realized. In a preferred embodiment the half-mirror surface of the prism block is formed of a dichroic mirror.

Other and further objects, features and advantages of the invention will appear more fully from the following description taken in connection with the accompanying drawings.

DESCRIPTION OF PREFERRED EMBODIMENTS

Figure 1:
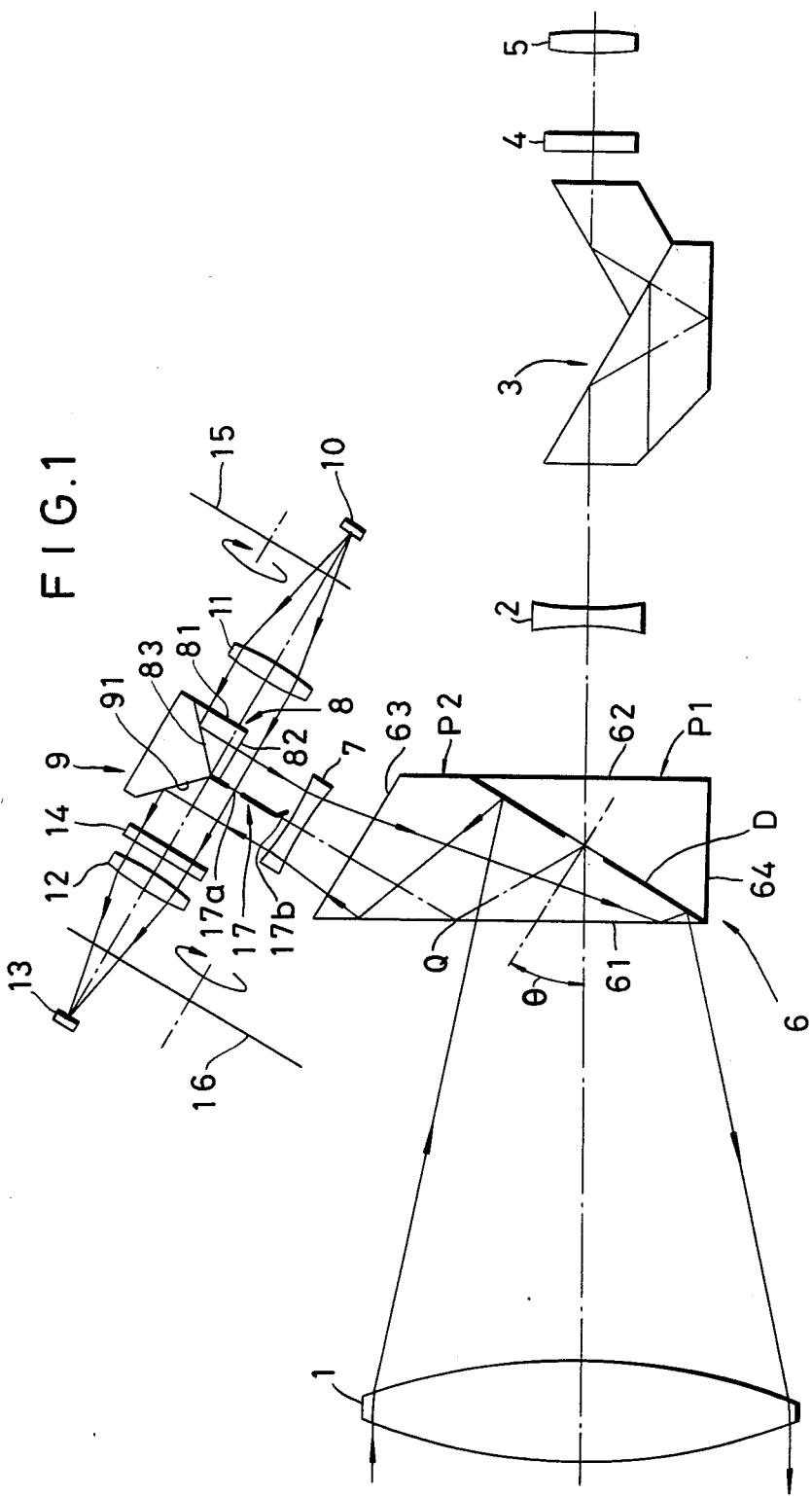
FIG. 1 is a schematic view showing the arrangement of the optical systems of the electro-optical distance measuring device according an embodiment of the invention.

Referring to FIG. 1 showing an embodiment of the electro-optical distance measuring device, an objective lens 1, focusing lens 2, erecting prism 3, reticle 4 and eye-piece 5 constitute together a collimating optical system. Disposed between the objective lens 1 and the focusing lens 2 is an optical path divider (beam splitter) 6 which is composed of two prisms P1 and P2.

The prism P1 is rectangular and P2 is trapezoid. The two prisms P1 and P2 are cemented together to provide an entrance surface 61 perpendicular to the optical axis A and first and second exit surfaces 62 and 63. The first exit surface 62 is parallel to the entrance surface 61. The second exit surface 63 is one of the slant faces of the prism P2. The surface along which the prisms P1 and P2 are cemented together forms a dichroic mirror surface D. The dichroic mirror D has a function to reflect infrared rays of light while transmitting visible rays of light. The infrared rays reflected by the dichroic mirror D is totally reflected by the entrance surface 61 and then transmitted through the second exit surface 63. Therefore, a beam of visible rays for collimation emerges from the first exit surface 62 whereas a beam of infrared rays for distance measurement emerges from the second exit surface 63 of the divider 6.

Disposed facing the second exit surface 63 is a distance measuring optical system including an auxiliary lens 7 of negative power on the optical path. The auxiliary negative lens 7 and the above-mentioned objective lens 1 constitute together a so-called Galilean afocal system. Therefore, a beam of light entering the objective lens 1 from an object at infinity emerges from the netative lens 7 as a collimated light beam. On the optical path of the collimated light beam there are provided a first reflecting member 8 and a second reflecting member 9. The first reflecting member 8 is in the area on one side of the optical axis and reflects the light to be transmitted. The second reflecting member 9 is in the area on another side of the optical axis and reflects the light to be received. The first reflecting member 8 has an entrance surface 81, an exit surface 82 and a slant reflecting surface 83. The entrance and exit surfaces 81 and 82 intersect each other at right angles. The slant surface 83 having an inclination angle of 45° is a back reflection surface formed by vapour deposition of silver. The surface 83 has a high reflecting power to infrared rays as well as visible rays. It is sufficient for electro-optical distance measuring that the reflecting surface 83 reflects the light of infrared region only. However, for the sake of easy adjustment, the reflecting surface 83 is desired to have a high reflecting power also to the visible light because the adjustment in the manufacture process can be carried out more conveniently with visible light. The second reflecting member 9 is formed of a rectangular prism. One slant face of the prism 9 is cemented to the slant face 83 of the first reflecting member 8. The other slant face 91 of the second reflecting member 9 is formed as a mirror surface by vapour deposition of a thin layer whose reflection power is the maximum to infrared rays. The two reflecting members 8 and 9 divide the optical path into optical path for transmitted light and optical path for received light. The two optical paths are on the same straight line intersecting the optical axis of the negative lens 7 at right angles.

The light beams in the two optical paths separated from each other by the reflecting members 8 and 9 are still kept collimated. In the two optical paths there are disposed positive lenses 11 and 12 respectively. A light-emitting diode 10 is provided at the focal point of the positive lens 11 and a photo diode is at the focal point of the positive lens 12. The light source 10, lens 11, reflecting member 8, negative lens 7, beam splitter 6 and objective lens 1 form together the transmission optical path of the distance measuring optical system. On the other hand, the objective lens 1, beam splitter 6, negative lens 7, reflecting member 9, lens 12 and photo sensor element 13 form together the reception optical path of the distance measuring optical system. Further, a reference light optical path is formed by the optical path extending directly from the light source 10 to the photo sensor 13 through the lenses 11 and 12.

In the arrangement shown in FIG. 1, the incident angle $\theta$ to the dichroic mirror surface D is the angle which the optical axis of the objective lens 1 forms with the normal line on the dichroic mirror surface. This angle of incidence $\theta$ is determined taking various limitations into consideration.

In order to realize a small size of beam splitter, at the entrance surface 61 of the beam splitter, the incident beam from the objective lens 1 and the reflected beam from the dichroic mirror surface D are to be overlapped each other. To this end, the entrance surface must be formed not as a mirror surface but as a transparent total-reflecting surface. Therefore, under the limitation by the critical angle at the entrance surface 61, the angle of incidence $\theta$ is required to satisfy the condition:

$$\theta > \tfrac{1}{2} \cdot \arcsin (1/n) \qquad , (1)$$

wherein, n is the refractive index of the prism P2.

On the other hand, when $\theta$ is small, the optical path for the distance measuring light emerging from the exit surface 63 comes close to the optical axis of the collimating optical system, which renders difficult the arrangement of the components of the distance measuring optical system.

On the contrary, if $\theta$ is large, the beam splitter needs large thickness in the direction of optical axis, that is, large distance from the entrance surface 61 to the first exit surface 62. This means the use of undesirably large collimating optical system. In addition, with increasing the angle $\theta$, the intersection Q of the optical axis of the distance measuring optical system and the entrance surface 61 is further away from the optical axis of the collimating optical system. As a result, the second prism P2 becomes larger and the overall size of the apparatus increases accordingly. Furthermore, as well-known from the thin film-forming technique, the property of the dichroic mirror becomes worse with increasing the incident angle $\theta$. Therefore, man can not select any large value for the incident angle $\theta$. If a large incident angle $\theta$ is selected, there may arise also difficulties in the manufacture of the system.

Taking the above limitations into consideration the preferred range of the angle $\theta$ is:

$$15° < \theta < 45°$$

In the above-shown embodiment, 30° has been selected for $\theta$.

In a preferred embodiment, the dichroic mirror surface D has a small light-transmissive area around the intersection of the dichroic mirror surface D and the optical axis of the objective lens. The small light-transmissive area is formed by omitting the vapour deposition on that area. By providing such light-transmissive area in the dichroic mirror surface D the optical path for transmission and the optical path for reception can effectively be separated from each other.

In a further preferred embodiment, an infrared-absorbing filter is bonded to the bottom surface 64 of the first prism P1 in order to prevent the generation of noise by the light reflected from the surface 64. For the same purpose, the angle of the bottom surface may be changed so as to prevent the reflected light from entering the optical path for the received light. It is recommendable that the refractive index of the prisms P1 and P2 is the same as the refractive index of the bonding agent with which the prisms are bonded together.

In the embodiment shown in FIG. 1, a filter 14 is interposed between the second reflecting member 9 and the lens 12. The function of the filter 14 is to cut off noise, i.e. light of other wavelength than the light to be received. Interposed between the light source 10 and the lens 11 is an optical path changeover device 15 which is rotatable about an axis shifted from the optical axis of the lens 11. The function of the device 15 is to change over the optical path between that for received light and that for reference light. Further, between the lens 12 and the photo sensor element 13 there is interposed a rotary filter 16 for equalizing the intensity of the received light to that of the reference light.

Figure 2:
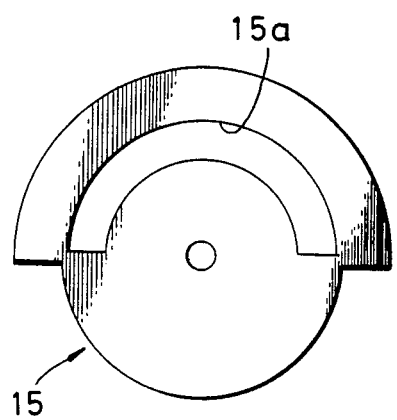
FIG. 2 is a plan view of the optical path changeover device.

A concrete form of the optical path changeover device 15 is shown in FIG. 2. The device 15 is in a form of screen disk having an arcuate slit 15a formed in the upper half of the disk. The under half of the disk 15a is cut out partly along its circumference. As the screen disk 15 is rotated, the optical path from the light source 10 to the first reflecting member 8 is formed during the time of the upper half being on the optical axis. The optical path for reference light extending from the light source 10 to the light receiving element 13 is formed during the time of the lower half being on the optical axis.

Figure 3:
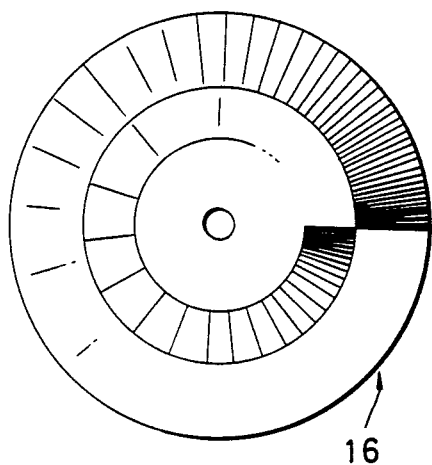
FIG. 3 is a plan view of the rotary filter.

FIG. 3 shows a concrete form of the rotary filter 16. The rotary filter is formed as a light-transmissive disk comprising an outer ring area in which the transmissivity changes gradually in one direction and an inner ring area in which the transmissivity changes gradually in the opposite direction. The outer ring area of the rotary filter 16 is used to control the intensity of the received light whereas the inner ring area is used to control the intensity of the reference light.

Figures 4A, 4B:
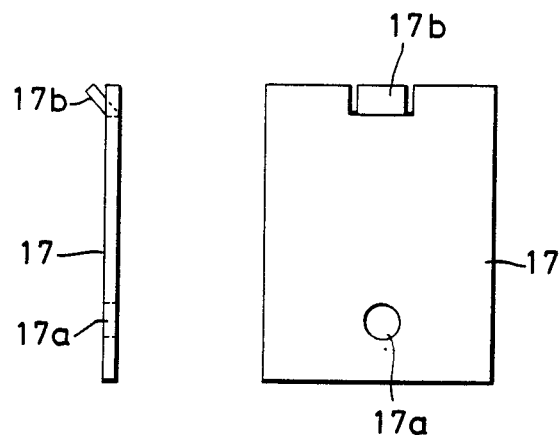
FIG. 4A is a side view of the screen plate member.
FIG. 4B is a plan view thereof.

Referring again to FIG. 1, a screen plate 17 is provided along the optical axis of the negative lens 7. The function of the screen plate 17 is to prevent the transmitted light from directly entering the received light path or the reference light path and also to prevent the reference light from entering the received light path. An embodiment of the screen plate 17 is shown in FIGS. 4A and 4B. The screen plate 17 has an opening 17a which the reference beam can pass through. At an edge near the negative lens 7 the screen plate 17 has a curved portion 17b bent out toward the side of the transmitted light path. The curved portion 17b prevents the received light path from being invaded by light rays near the optical axis by internal reflection or the like.

In the above-shown embodiment of the invention, light rays are kept collimated between the transmitting lens 11 and the negative lens 7, between the negative lens 7 and the receiving lens 12 and between the transmitting lens 11 and the receiving lens 12. This parallel ray system brings forth the following advantages:

Firstly, the focal length of the whole transmitting optical system can be shortened by changing the focal length of the transmitting lens 1 without substantially increasing the overall length of the transmitting optical system. As generally known, in a transmitting optical system, wider transmission angle and broader range of distance measurement are available with shorter focal length of the whole transmitting optical system. In this respect, the arrangement according to the invention is advantageous in designing an optical apparatus for distance measurement. It provides high degree of freedom of design.

Secondly, the adjustment of the system can be carried out perfectly with visible light observation. Since the distance measuring light is infrared, the filter 14 must be removed when adjustment is carried out. However, the insertion and removal of the filter produces no problem of focus shift and/or shift of optical axis because the light beam in which the filter is inserted is a collimated light beam. Therefore, even for infrared light, sufficient adjustment can be assured through observation by visible light. In addition, since the beam incident on the filter is neither diverging beam nor converging beam, there is no afraid of that the performance of the optical system may be adversely affected by the angular characteristics of the multi-layer film of the filter.

Lastly, the arrangement of the optical system according to the invention is simple. A part of the transmitting optical system as well as a part of the receiving optical system are used also to form the optical path of the reference optical system. Therefore, the reference optical system needs no particular members proper to it. This enables a simple structure of the optical apparatus. Furthermore, since the light source and the light-receiving element are arranged on the same optical axis, the adjustment can be carried out very easily and correctly.

I claim:

1. Apparatus for distance measurement comprising:
   (a) a collimating optical system containing objective lens means, focusing lens means and eye-piece means arranged in the named order;
   (b) optical path dividing means disposed between said objective lens means and said focusing lens means, said optical path dividing means containing a reflecting surface disposed inclined relative to the optical axis of said objective lens means and formed to partly transmit light;
   (c) auxiliary lens means disposed in the optical path divided from the optical path of said collimating optical system by said reflecting surface, said auxiliary lens means cooperating with said objective lens means to form an afocal system;
   (d) transmission means comprising a light source, means for collimating the light from said light source and first optical means for making the collimated light enter a part of the area of said auxiliary lens means from the direction parallel to the optical axis of said auxiliary lens means, through which transmission means the light from said light source is emitted from said objective lens means; and
   (e) reception means comprising second optical means for sampling the light passing through another part of the area of said auxiliary lens means after entering said objective lens means, photo receptor means having a light-receiving surface for forming an electric output corresponding to the quantity of the light received by it and means for focusing the light coming from said second optical means on said light-receiving surface of said photo receptor means.

2. Apparatus according to claim 1, wherein said first optical means includes a first reflecting surface disposed inclined relative to the optical axis of said auxiliary lens means and said second optical means includes a second reflecting surface intersecting said first reflecting surface at right angles, the intersection being on the optical axis of said auxiliary lens means.

3. Apparatus according to claim 1, wherein said auxiliary lens means has a negative power.

4. Apparatus according to claim 1, which further comprises a screen plate member disposed in the collimated light beam in the vicinity of said auxiliary lens means and along a plane containing the optical axis of said auxiliary lens means so that the light running from said first optical means to said 5. Apparatus according to claim 4, wherein said screen plate member has a light-blocking projection protruding into the beam of light running to said first part of area and provided at a position close to said auxiliary lens means and containing the optical axis thereof.

6. Apparatus for measuring distance to an object by emitting a beam of infrared rays from a light source and receiving the infrared beam reflected by said object, said apparatus comprising:

(a) a collimating optical system comprising objective lens means, focusing lens means and eye-piece means arranged in the named order;

(b) optical path dividing means disposed between said objective lens means and said focusing lens means and comprising a prism member having a first surface facing said objective lens means and extending substantially normal to the optical axis of the latter, a second surface facing said focusing lens means and extending substantially parallel to said first surface and a third surface between said first and second surfaces, and dichroic mirror means disposed slant between said first and second surfaces and reflective to said infrared beam;

(c) first optical means for making the infrared beam from said light source enter said prism member from the side of said third surface, said infrared beam entered from said third surface being total-reflected by said first surface and then directed to said objective lens means from said prism member passing through said dichroic mirror means and said first surface; and (d) photo receptor means for forming an electric output corresponding to the quantity of the infrared light coming from said object and received by said photo receptor means, said received infrared light being that which has entered said prism member from its first surface side passing through said objective lens means, then reflected by said dichroic mirror means toward said first surface and exited from said prism member through its third surface after total-reflected by said first surface.

7. Apparatus according to claim 6, wherein said dichroic mirror means is disposed intersecting the optical axis of said objective lens means and a particularly selected area of said dichroic mirror means containing the intersection is so formed as to be transmissive to said infrared light.

* * * * *